United States Patent
Roth

(10) Patent No.: US 6,712,549 B2
(45) Date of Patent: Mar. 30, 2004

(54) DOUBLE-AXIS OSCILLATING BOGIE WHEELS

(75) Inventor: Thomas A. Roth, Lerna, IL (US)

(73) Assignee: Blaw-Knox Construction Equipment Corporation, Mattoon, IL (US)

( * ) Notice: Subject to any disclaimer, the term of this patent is extended or adjusted under 35 U.S.C. 154(b) by 0 days.

(21) Appl. No.: 10/192,127

(22) Filed: Jul. 9, 2002

(65) Prior Publication Data

US 2004/0009038 A1 Jan. 15, 2004

(51) Int. Cl.$^7$ ............................................... E01C 19/22
(52) U.S. Cl. ........................................ 404/83; 404/118
(58) Field of Search .............................. 180/9.34, 9.36, 180/9.44, 9.46, 69.21, 9.5, 6.44, 6.7, 6.64; 172/383, 386; 305/116, 124, 130, 131, 132, 133, 134, 135; 404/83, 118

(56) References Cited

U.S. PATENT DOCUMENTS

| | | | | |
|---|---|---|---|---|
| 3,275,386 A | * | 9/1966 | Bexten | 305/116 |
| 3,343,889 A | * | 9/1967 | Bexten | 305/10 |
| 3,455,405 A | | 7/1969 | Parent | |
| 3,776,326 A | * | 12/1973 | Davin et al. | 305/23 |
| 3,901,616 A | * | 8/1975 | Greening | 404/102 |
| 4,166,511 A | | 9/1979 | Stedmann | |
| 4,647,116 A | * | 3/1987 | Trask | 305/27 |
| 5,409,305 A | * | 4/1995 | Nagorcka | 305/21 |
| 5,590,977 A | | 1/1997 | Guntert et al. | |
| 5,639,148 A | * | 6/1997 | Sheidler | 305/116 |
| 6,394,204 B1 | * | 5/2002 | Haringer | 180/9.52 |

FOREIGN PATENT DOCUMENTS

| | | | | |
|---|---|---|---|---|
| DE | 550 145 | | 9/1932 | |
| DE | 604 009 | | 12/1934 | |
| GB | 2031824 A | * | 9/1979 | B62D/55/10 |

* cited by examiner

Primary Examiner—Thomas B. Will
Assistant Examiner—Raymond W Addie
(74) Attorney, Agent, or Firm—Michael Best & Friedrich LLP

(57) ABSTRACT

A wheel assembly is for mobilizing a construction vehicle upon a base surface and includes a frame connected with the vehicle and configured to pivot about a first axis. At least one and preferably two axles are connected with the frame and configured to pivot respectively about a second axis and a third axis, the second and third axes each extending generally perpendicularly with respect to the first axis. Each axle has a longitudinal centerline extending generally perpendicularly with respect to the second axis. Two wheels are preferably connected with each axle so as to rotate generally about each axle centerline. When the wheels are disposed generally upon the base surface, the wheels roll with respect to the surface so as to at least partially mobilize the vehicle. Further, angular displacement of the frame and the axle about the second axis move the wheels within two perpendicular vertical planes.

25 Claims, 9 Drawing Sheets

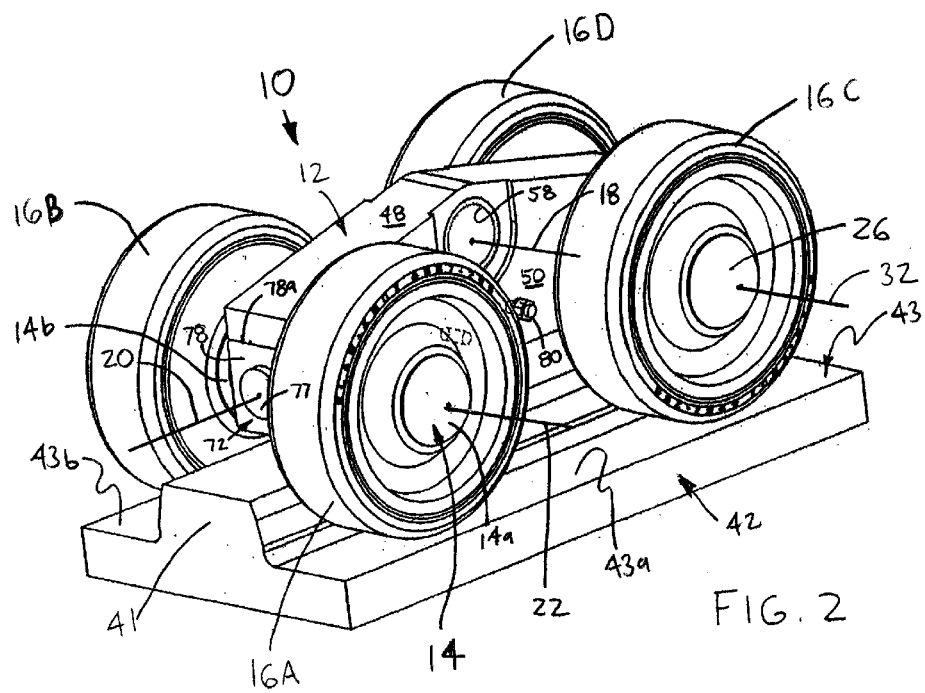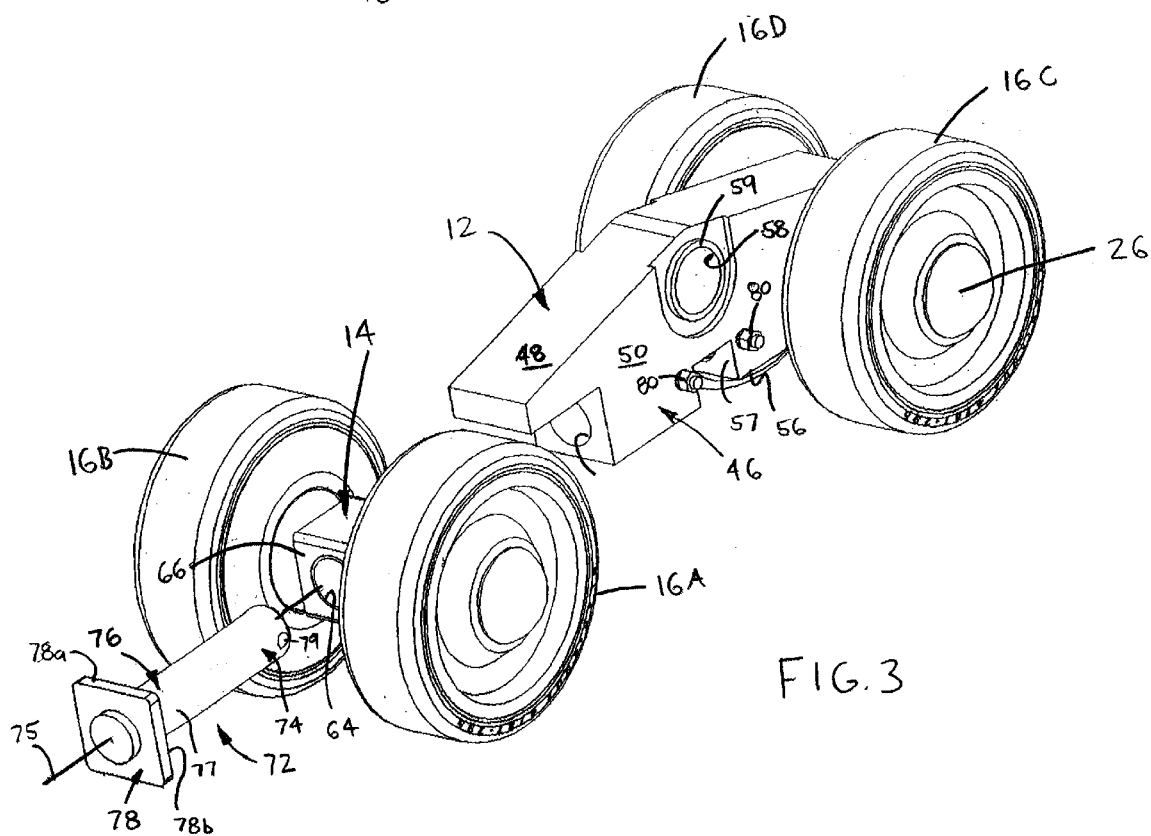

DOUBLE-AXIS OSCILLATING BOGIE WHEELS

BACKGROUND OF THE INVENTION

The present invention relates to paving vehicles, and more particularly to wheel systems used to mobilize paving vehicles.

Paving vehicles or pavers basically include a tractor and a screed towed from the rear of the tractor for leveling and compacting paving material, such as asphalt, deposited off the back of the tractor to form a mat of material (e.g., for a roadway). Certain tractors include a chassis, a pair of wheel trains each mounted to a separate lateral side of the chassis and two "crawlers" or endless tracks/belts each encircling one of the wheel trains. Each wheel train typically includes a drive wheel, several bogie wheels and an idler or take-up wheel (although a second drive wheel may alternatively be provided).

In general, the bogie wheels and the take-up wheels are arranged in laterally spaced-apart pairs that are mounted on common or collinear axles. These axles are usually mounted in pairs to a support body or frame that is pivotally attached to the tractor frame, such that each frame connects four wheels to the chassis. By being pivotally attached to the chassis, these "bogie wheel assemblies" enable the four wheels to pivot or oscillate in frontward and rearward directions.

Although such known bogie assemblies are generally effective, it would be desirable to provide any improvement in the performance and capabilities of paver bogie wheels.

BRIEF SUMMARY OF THE INVENTION

In a first aspect, the present invention is a wheel assembly for mobilizing a construction vehicle upon a base surface. The wheel assembly comprises a frame connected with the vehicle and configured to pivot about a first axis so as to be angularly displaceable with respect to the vehicle. An axle is connected with the frame and is configured to pivot about a second axis so as to be angularly displaceable with respect to the frame, the second axis extending generally perpendicularly with respect to the first axis. The axle has a longitudinal centerline extending generally perpendicularly with respect to the second axis. Further, a wheel is connected with the axle, is configured to rotate generally about the axle centerline and is disposable generally upon the base surface.

In another aspect, the present invention is also a wheel assembly for mobilizing a paving vehicle upon a base surface. The vehicle has an endless belt disposed about the wheel assembly and the belt has an inner circumferential surface and an opposing, outer circumferential surface. The wheel assembly comprises an axle connected with the vehicle and has a longitudinal centerline, the axle being configured to pivot about a first axis and configured to pivot about a second axis. The second axis extends generally perpendicularly with respect to the first axis and generally perpendicularly with respect to the axle centerline. Further, a wheel is connected with the axle and is contactable with the belt inner surface, the wheel being configured to rotate generally about the axle centerline such that the wheel rolls upon the belt inner surface as the belt circulates about the wheel train to mobilize the vehicle.

In a further aspect, the present invention is again a wheel assembly for mobilizing a construction vehicle upon a base surface. The wheel assembly comprises a connective member movably connected with the vehicle and configured to pivot about a first axis and configured to pivot about a second axis extending generally perpendicularly with respect to the first axis. An axle is attached to the connective member and has a longitudinal centerline extending generally perpendicularly with respect to the second axis. Further, a wheel is connected with the axle and is configured to rotate generally about the axle centerline such that when the wheel is disposed generally upon the base surface, the wheel rolls with respect to the surface so as to at least partially mobilize the vehicle.

In yet another aspect, the present invention is a bogie wheel assembly for mobilizing a paving vehicle chassis upon a base surface. The chassis has a front end, a rear end and a longitudinal centerline extending generally between the front and rear ends. The wheel assembly comprises an axle connected with chassis and configured to pivot about an axis, the axis being spaced a substantial distance from and extending generally parallel with respect to the chassis centerline. The axle has two opposing ends and a longitudinal centerline extending generally perpendicularly with respect to the axis. Further, the assembly includes two wheels. Each wheel is movably connected with a separate one of the two axle ends so as to be rotatable generally about the axle centerline and rollable with respect to the base surface to at least partially mobilize the vehicle upon the surface.

In yet an even further aspect, the present invention is a paving vehicle comprising a chassis having a front end, a rear end, first and second opposing sides and a longitudinal centerline extending between the front and rear ends. A first wheel assembly and a second wheel assembly are each connected with a separate one of the first and second chassis sides. Each wheel assembly includes an axle, the axle having a central portion, two opposing ends and a centerline extending between the two ends. Each axle is configured to pivot about a separate horizontal axis extending through the axle central portion and generally parallel with respect to the chassis centerline. Further, each of the wheel assemblies includes two wheels, each wheel movably connected with a separate end of the axle so as to be rotatable about the axle centerline.

In yet an additional aspect, the present invention is a bogie wheel assembly for a paving vehicle. The wheel assembly comprises a frame movably connected with the vehicle so as to be pivotable about a first axis. An axle has a longitudinal centerline and is movably connected with the body so as to be pivotable about a second axis. The second axis extends generally perpendicularly with respect to the axle centerline and generally perpendicularly with respect to the first pivot axis. Further, a bogie wheel is movably connected with the axle so as to be rotatable about the axle centerline. The wheel is displaceable generally within a first plane by pivotal displacement of the frame about the first axis and is displaceable within a second plane by pivotal displacement of the axle about the second axis, the second plane being generally perpendicular to the first plane.

BRIEF DESCRIPTION OF THE SEVERAL VIEWS OF THE DRAWINGS

The foregoing summary, as well as the detailed description of the preferred embodiments of the invention, will be better understood when read in conjunction with the appended drawings. For the purpose of illustrating the invention, there is shown in the drawings, which are diagrammatic, embodiments that are presently preferred. It should be understood, however, that the invention is not limited to the precise arrangements and instrumentalities shown. In the drawings:

FIG. 2 is a side perspective view of a wheel assembly in accordance with the present invention, shown disposed upon a portion of an endless track;

FIG. 3 is a partly exploded perspective view of the wheel assembly;

DETAILED DESCRIPTION OF THE INVENTION

Figure 1:
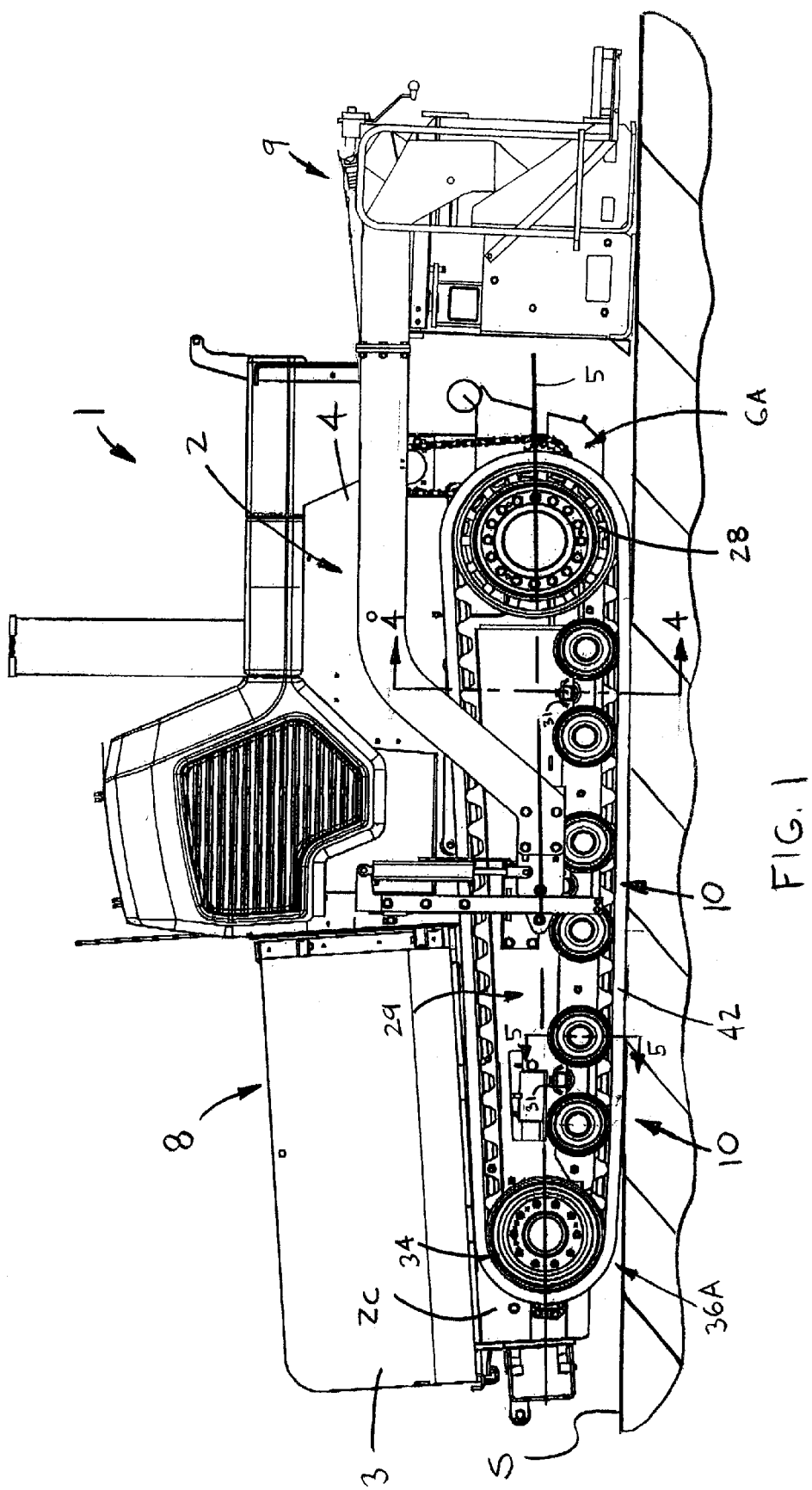
FIG. 1 is side elevational view of a paving vehicle having a plurality of wheel assemblies formed in accordance with a presently preferred embodiment of the present invention.

Certain terminology is used in the following description for convenience only and is not limiting. The words "inner", "inward" and "outer", "outward" refer to directions toward and away from, respectively, the geometric center of a wheel assembly, of a paving vehicle or of a component thereof, the particular meaning being readily apparent from the context of the description. The words "front", "frontward" and "rear", "rearward" refer to directions generally toward and away from, respectively, the designated front section of the wheel assembly or the paving vehicle. The terminology includes the words specifically mentioned above, derivatives thereof, and words or similar import.

Referring now to the drawings in detail, wherein like numbers are used to indicate like elements throughout, there is shown in FIGS. 1–14 a presently preferred embodiment of a wheel assembly 10 for mobilizing a construction vehicle 1 upon a base surface S. The wheel assembly 10 basically comprises a connective member or frame 12 connected with the vehicle 1, at least one axle 14 connected with the frame 12 and at least one wheel 16 (and preferably a plurality of wheels 16 as discussed below) connected with the axle 14. The frame 12 is configured to be pivotable about a first axis 18 so as to angularly displace with respect to the vehicle 1. The axle 14 is configured to be pivotable about a second axis 20 so as to angularly displace with respect to the frame 12, the second axis 20 extending generally perpendicularly with respect to the first axis 18. Also, the axle 14 has a longitudinal centerline 22 extending generally perpendicularly with respect to the second axis 20. Further, the one or more wheels 16 are each configured to rotate generally about the axle centerline 22 and are disposable generally upon the base surface S. As such, when each wheel 16 is disposed generally upon the base surface S, the wheel 16 rolls with respect to the base surface S so as to at least partially mobilize the vehicle 1. In other words, each wheel 16 functions, alone (not preferred) or in combination with other wheels 16 and/or endless track(s) 42, to cause the vehicle to traverse the surface S, as in detail below.

Figure 9:
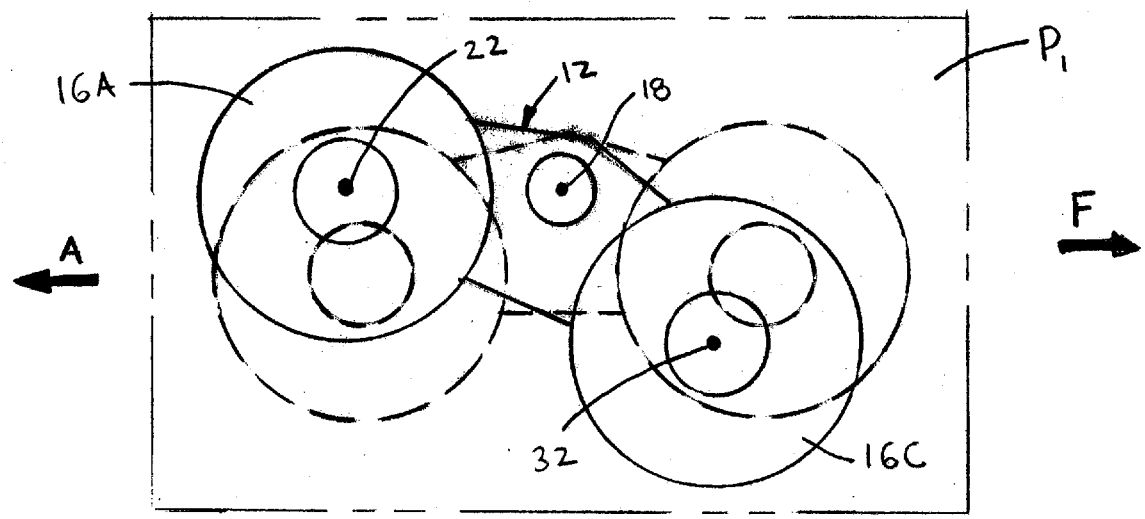
FIG. 9 is a more diagrammatic front elevational view of the wheel assembly shown pivoting about a first axis so as to displace within a first vertical plane between two positions.
Figure 10:
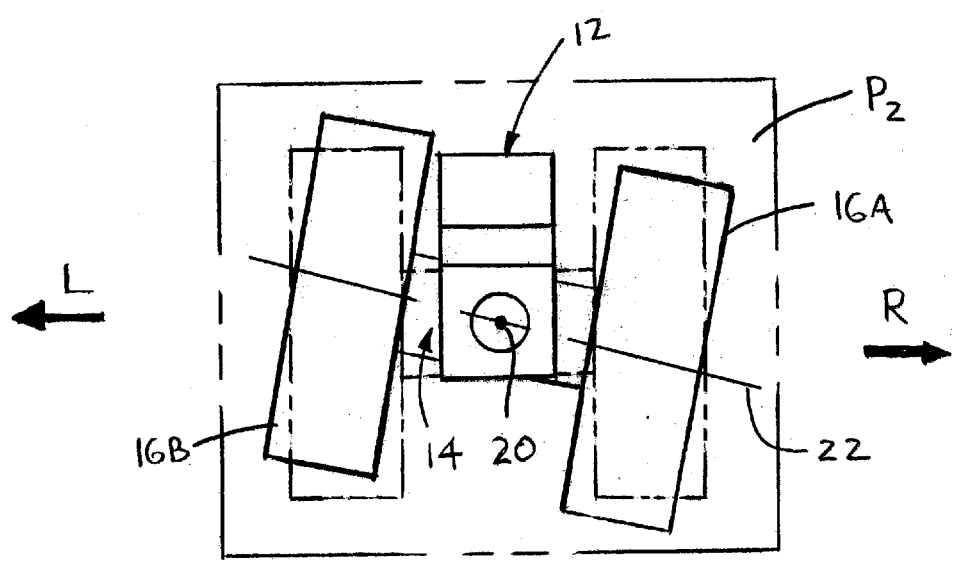
FIG. 10 is a more diagrammatic side elevational view of the wheel assembly shown pivoting about a second axis so as to displace within a second vertical plane between two positions.

Referring to FIGS. 9 and 10, with the wheel assembly 10 being configured as described above, each of the wheels 16 is displaceable generally within a first vertical plane P, (represented by phantom boundary lines in FIG. 9) by pivotal displacement of the frame 12 about the first axis 18. In addition, the wheel(s) 16 are also displaceable within a second vertical plane $P_2$ (represented by phantom boundary lines in FIG. 10) by pivotal displacement of the axle 14 about the second axis 20, the second plane $P_2$ being generally perpendicular to the first plane $P_1$. More specifically, the pivotal movement of the frame 12 about the first axis 18 displaces the wheel 16 within the first plane $P_1$, which extends generally vertically-and longitudinally through the wheel 16 and perpendicularly to the first axis 18 and centerline 22, as shown in FIG. 9. Preferably, the frame 12 is connected with the vehicle 1 such that the first plane $P_1$ extends generally parallel to the two sides 6A, 6B (discussed below) of the vehicle 1 and generally perpendicularly with respect to the vehicle front and rear ends 2, 3, respectively (discussed below). As such, movement of the wheel(s) 16 within the first plane $P_1$ displaces the wheel(s) 16 longitudinally with respect to the vehicle 1 in generally frontward or rearward directions F, A, respectively.

Further, the pivotal movement of the axle 14 about the second axis 20 displaces the wheel 16 within the second plane $P_2$, which extends generally vertically and laterally through the wheel 16 and the centerline 22 and perpendicularly to the second axis 20, as shown in FIG. 10. With the preferred connection of the frame 12 with the vehicle 1 (as discussed above and in further detail below), the second plane $P_2$ extends generally parallel with two vehicle ends 3, 4 and generally perpendicularly with respect to the two vehicle sides 6A, 6B. As such, movement of the wheel(s) 16 within the second plane $P_1$ displaces the wheel(s) 16 laterally with respect to the vehicle 1 in generally rightward or leftward directions R, L, respectively. Furthermore, the wheel assembly 10 is configured such that the displacement (s) of the wheel 16 within each of the two planes $P_1$, $P_2$ may occur separately, simultaneously, or sequentially.

Figure 13:
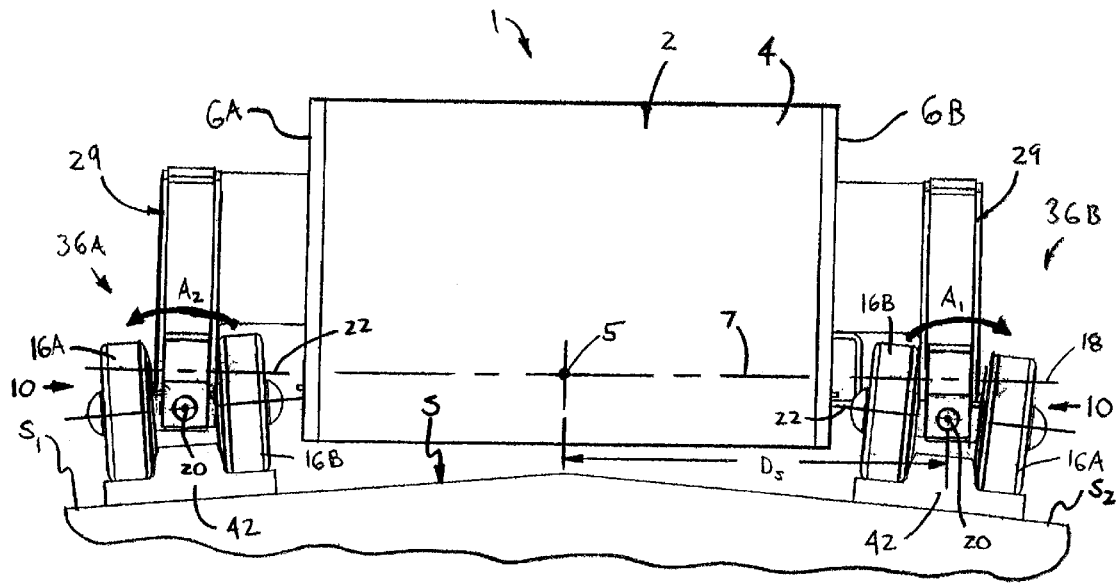
FIG. 13 is a rear elevational view of a paving vehicle shown traveling over a positively sloped surface.
Figure 14:
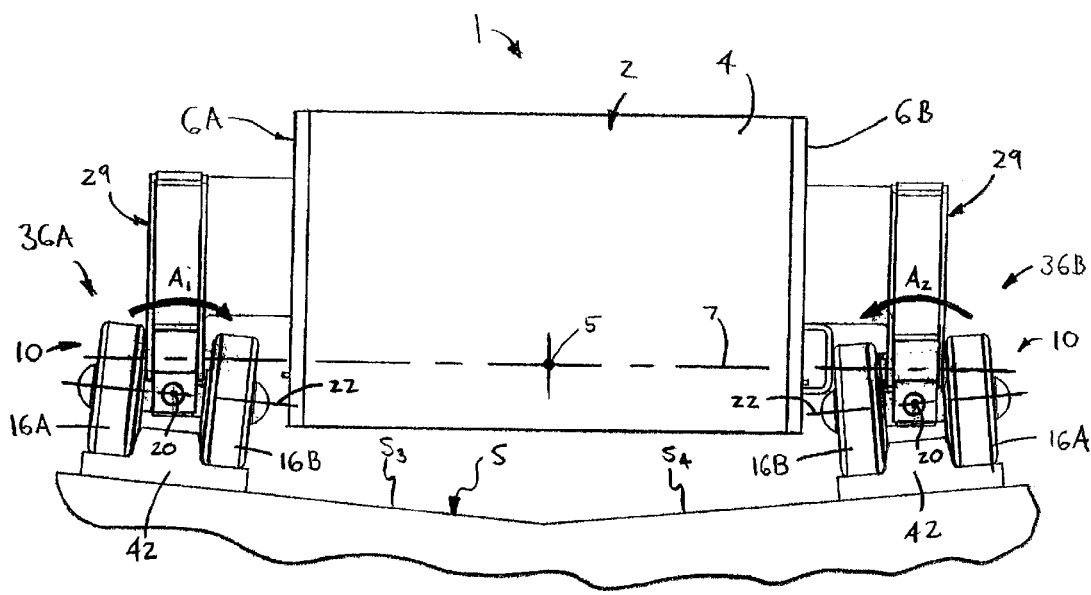
FIG. 14 is a rear elevational view of a paver traveling over a negatively sloped surface.

Referring to FIGS. 1, 13 and 14, the wheel assembly 10 is preferably used with a paving vehicle 1 that includes a tractor 8 having a chassis 2 including the front end 3, the rear end 4 and a longitudinal centerline 5 extending generally between the front and rear ends 3, 4, respectively, and generally parallel with respect to the second axis 20. Further, the chassis 2 also has the two spaced-apart sides 6A, 6B, each side 6A, 6B extending generally between the front and rear ends 3 and 4, respectively, and a lateral centerline 7 extending generally between the two sides 6A, 6B and generally parallel with respect to the first axis 18. Preferably, the vehicle 1 has at least one and preferably a plurality of wheel assemblies 10 connected with each side 6A and 6B of the chassis 2, as discussed in further detail below. In addition, the paving vehicle 1 also preferably includes a screed 9 towed from the rear end 4 of the tractor 8.

Figure 12:
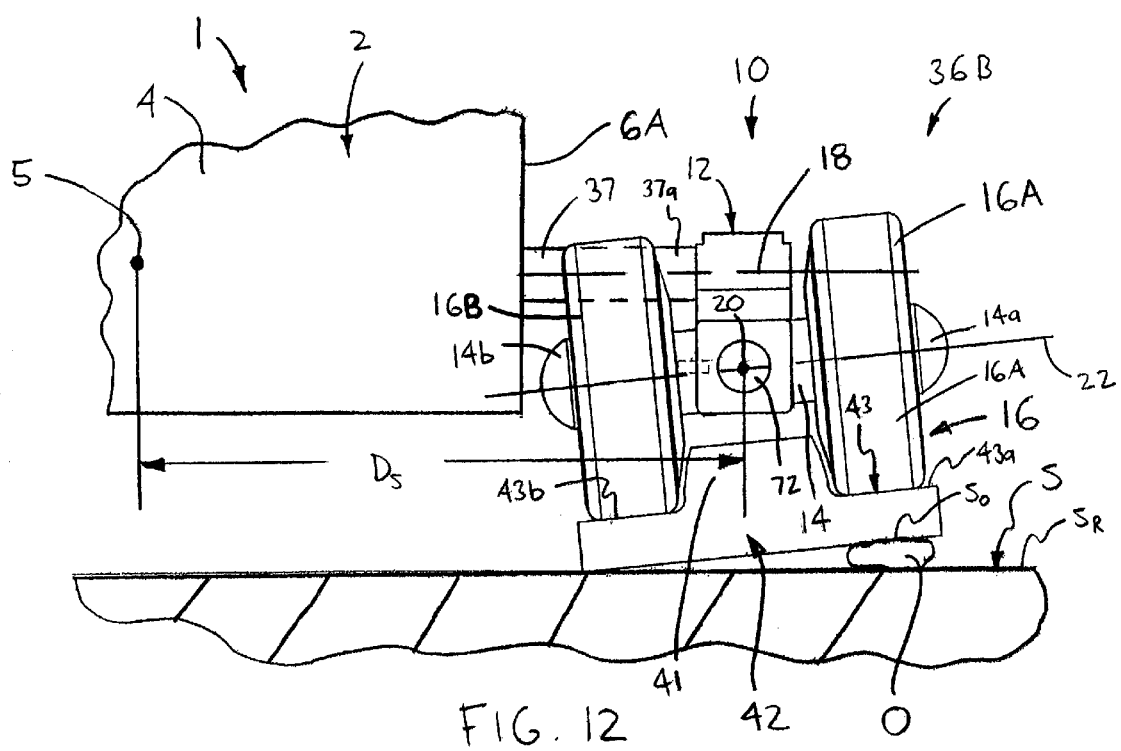
FIG. 12 is a broken-away, rear elevational view of the wheel assembly shown pivoting laterally to negotiate an obstacle.

The benefits of the wheel assembly 10 are more fully realized by the preferred construction of the assembly 10, which further comprises at least another wheel 16 connected with the axle 14. More specifically, as indicated in FIGS. 2 and 12, the axle 14 has first and second opposing ends 14a, 14b, the axle centerline 22 extends generally between the ends 14a, 14b, and the first wheel 16, hereinafter 16A, is connected with the axle 14 proximal to the first end 14a. The other or "second" wheel 16B is connected with the axle 14 proximal to the second axle end 14b and is configured to rotate generally about the axle centerline 22 such that when the second wheel 16B is disposed generally upon the base surface S, the second wheel 16B also rolls with respect to the base surface S so as to at least partially mobilize the vehicle 1, i.e., in conjunction with at least the "first" wheel 16A. Further, the second wheel 16B is displaceable laterally within the same second plane $P_2$ (i.e., about second axis 20) as the first wheel 16A, as depicted in FIG. 10. However, the second wheel 16B is displaceable longitudinally within a third vertical plane (not shown) that is spaced from and extends substantially parallel with respect to the first plane $P_1$. With the described two wheels 16A, 16B, when the vehicle 1 traverses a surface S that is uneven in lateral directions with respect to the chassis 2 (i.e., in directions generally along the lateral centerline 7), the axle 14 pivots about the second axis 20 so that both wheels 16A, 16B remain generally disposed upon the base surface S, as discussed in detail below.

Referring specifically to FIG. 13, when the vehicle 1 is mobilized upon or "straddles" a base surface S having two laterally-extending, angled surface sections S1, S2 that converge in inwardly-upward directions (i.e., sloped upwardly towards the surface center), such as with a "crowned" road bed or surface, the axle 14 of each wheel assembly 10 connected with one side, e.g., side 6B, of the vehicle 1 angularly displaces outwardly in a first angular direction A1 about the associated second axis 20. At generally the same time, the axle(s) 14 of the wheel assemblies 10 connected with the other side, i.e., side 6A, of the vehicle 1 each angularly displace outwardly in a second, opposing angular direction $A_2$ about the associated second axis 20, such that all the wheels 16A, 16B on the vehicle 1 remain generally disposed upon the base surface S, preferably through contact with the belt 42 as discussed below. Further, referring specifically to FIG. 14, when the vehicle 1 is mobilized upon a base surface S having two laterally-extending, angled surface sections $S_3$, $S_4$ that converge in inwardly-downward directions, such as with a gully or a ditch, the axle 14 of each wheel assembly 10 located on one side, e.g., side 6B, of the vehicle 1 each angularly displace inwardly in the second direction $A_2$ about the associated second axis 20. At generally the same time, the axle(s) 14 of the assemblies 10 located on the other side, i.e., side 6A, of the vehicle 1 each angularly displace inwardly in the first direction A1 about the associated second axis 20 to maintain the wheels 16A, 16B disposed generally upon the base surface S.

Furthermore, when the vehicle 1 traverses a base surface S having a generally horizontal section (not shown) and an inclined surface section (not shown) extending partially in a vertical direction, such that the wheel assemblies 10 on one vehicle side 6A are disposed upon the horizontal surface and the wheel assemblies 10 on the other chassis side 6B are disposed upon the inclined section, the chassis 2 will displace in a first angular direction about the longitudinal centerline 5 and generally toward the inclined surface section. When the chassis 2 so displaces, the axle 14 of each wheel assembly 10 located on the horizontal surface section angularly displaces in a second, opposing angular direction about the associated second axis 20 in order to maintain the wheels 16A, 16B of each such wheel assembly 10 generally disposed upon the base surface S. The described movement of the chassis 2 and wheel assemblies 10 may be depicted by rotating either FIG. 13 or FIG. 14 so that one of the surface sections $S_1$, $S_2$ or $S_3$, $S_4$ shown in FIG. 13 or FIG. 14, respectively, is generally horizontal.

In addition, when the vehicle 1 traverses uneven terrain, each axle 14 on either or both sides 6A, 6B of the vehicle 1 pivot as required about the associated second axes 20 in the angular directions $A_1$ or $A_2$ and by the angular displacement (s) necessary to ensure that all wheels 16 connected with the vehicle 1 remain in contact with the ground/base surface S (i.e., preferably through contact of the belt 42). In other words, each axle 14 pivots separately and independently of all the other axles 14 so that any particular axle 14 angularly displaces about the associated second axis 20 as necessary to ensure that the associated wheel assembly 10 is able to negotiate the specific section of the base surface S over which the assembly 10 travels. Referring to FIG. 12, when the base surface S has a "local" (i.e., at a particular location) offset surface section $S_O$ spaced vertically (upwardly or downwardly) from a remaining section of the surface $S_R$, such as provided by the upper surface of an obstacle O, a ridge (not shown), or a pothole/depression (not shown), angular displacement of the axle 14 about the second axis 20 permits one of the two wheels, e.g., wheel 16A, to roll upon the offset section $S_O$ as the other one of the two wheels, e.g., wheel 16B, rolls upon the remaining surface section $S_R$.

Referring to FIGS. 1, 2, 5 and 8, the wheel assembly 10 preferably further comprises another axle 26 connected with the frame 12 and at least one and preferably two other wheels 16C and 16D connected with the other axle 26. More specifically, the other or "second" axle 26 is connected with the frame 12 so as to be spaced from the "first" axle 14 and is configured to be pivotable about a third axis 30 extending generally perpendicularly with respect to the first axis 18. The third axis 30 is at least parallel to, and is preferably collinear with, the second axis 20. The second axle 26 has a longitudinal centerline 32 extending generally perpendicularly with respect to the third axis 30. Further, the other or "third" and "fourth" wheels 16C, 16D, respectively, are each connected with the second axle 26, preferably to each opposing axle end 26a, 26b (see FIG. 5), and are configured to rotate generally about the second axle centerline 32.

As such, when the third and fourth wheels 16C, 16D, respectively, are disposed upon the base surface S, the two wheels 16C, 16D are rollable with respect to the base surface S so as to at least partially mobilize the vehicle 1, i.e., in combination with the first and second wheels 16A, 16B, respectively. Furthermore, the third wheel 16C is displaceable longitudinally within the same first vertical plane $P_1$ (i.e., about first axis 18) as the first wheel 16A, as depicted in FIG. 9, while the fourth wheel 16D is displaceable within the same third plane (not shown) as the second wheel 16C, which extends parallel to the first plane $P_1$. In addition, the third and fourth wheels 16C, 16D are displaceable laterally within a fourth vertical plane (not shown) spaced from and extending substantially parallel with respect to the second plane $P_2$ shown in FIG. 10.

Figure 11:
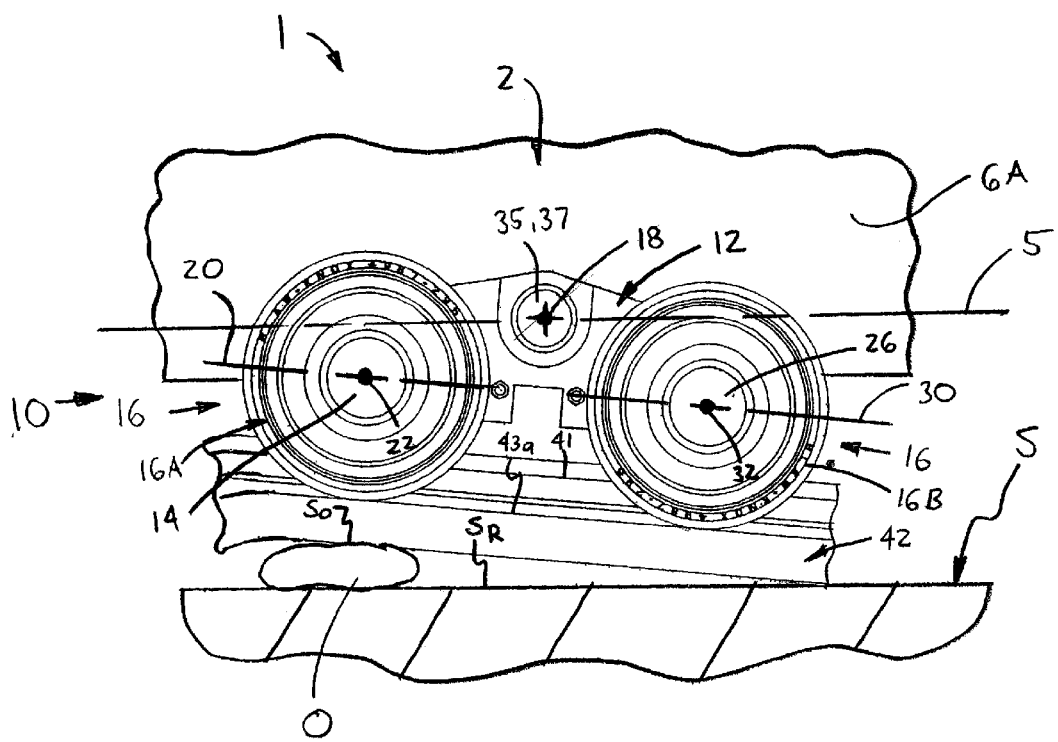
FIG. 11 is a broken-away, side elevational view of the wheel assembly shown pivoting longitudinally to negotiate an obstacle.

By being pivotable in frontward and rearward directions about the first axis 18, the wheel assemblies 10 are able to maintain all four of the wheels 16A, 16B, 16C and 16D generally disposed upon the base surface S whenever the vehicle 1 travels over obstacles C or the chassis 2 pivots about the lateral centerline 7. Referring specifically to FIG. 11, when the base surface S has a "local" (i.e., at a particular location) offset surface section $S_O$ spaced vertically (upwardly or downwardly) from a remaining section of the surface $S_R$, as discussed above, angular displacement of the frame 12 about the first axis 20 permits one pair of the wheels, e.g., wheels 16A and 16B (as depicted), to roll upon the offset section $S_O$ as the other pair of wheels, i.e., wheels 16C, 16D, roll upon the remaining surface section $S_R$. Further, when the vehicle 1 begins traversing a longitudinal incline/decline or "grade" so that the wheel assemblies 10 at the front and rear ends 3, 4, respectively, are on sections of the surface S that have different grade values, the chassis 2 will displace about the lateral centerline 7. When the chassis 2 so displaces, each wheel assembly 10 pivots as required about the associated first axis 18 to maintain all the wheels 16 of the particular assembly 10 in contact with the surface S.

Figure 4:
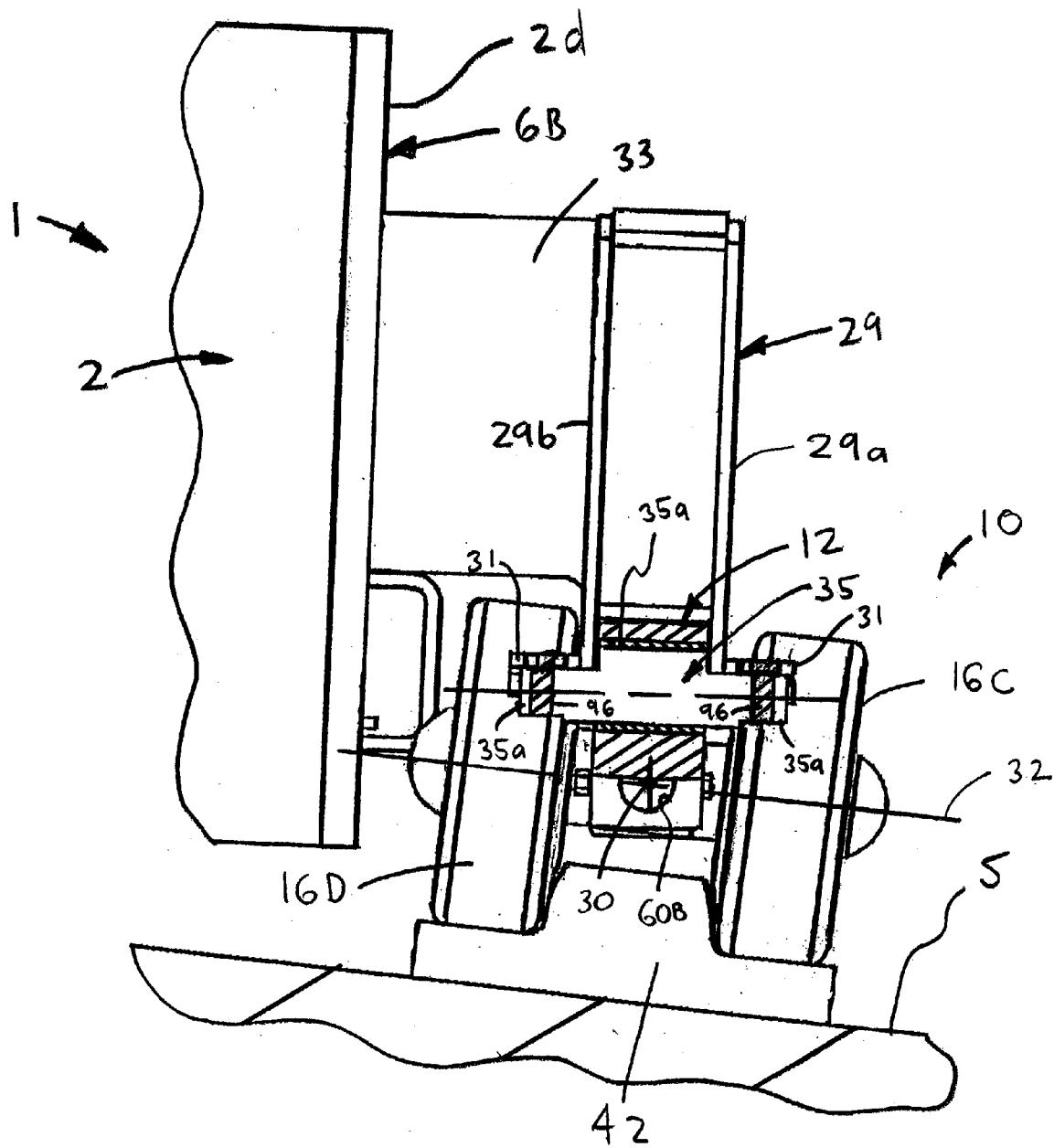
FIG. 4 is a side cross-sectional view of the wheel assembly taken through line 4—4 of FIG. 1.

Referring to FIGS. 1, 4, 13 and 14, the vehicle 1 preferably has two wheel trains 36A, 36B each connected or mounted to a separate one of the sides 6A, 6B, respectively, of the tractor chassis 2. Preferably, the two wheel trains 36A, 36B are generally identically constructed, but are arranged on the chassis 2 so as to be oppositely oriented with respect to the longitudinal centerline 5. Specifically, as best shown in FIG. 1, each wheel train 36A, 36B preferably includes at least one and preferably three of the wheel assemblies 10, a drive wheel 28 and an idler wheel 34 (or a second drive wheel (not shown)). Further, each wheel train 36A, 36B preferably includes a generally rectangular frame 29 extending longitudinally along and attached to each side 6A, 6B of the chassis 2, preferably by means of a plurality of laterally extending connective plates 33 (only one shown on each side 6A, 6B). As best shown in FIG. 4, the wheel assemblies 10 (and the other wheels 28, 34) of each wheel train 36A, 36B are attached to each frame 29, preferably by means of pin shafts 35 (as discussed below) so as to be pivotally connected with the vehicle 1. Alternatively, the vehicle 1 may be provided with a plurality of stub shafts 37 configured to rotatably connect each one of the wheel assemblies 10 directly to the vehicle chassis 2, as shown in FIG. 12. Further, the pin shafts 35 or stub shafts 37 each establish the preferred locations of the second and third axes 20, 30, respectively, and the axle centerlines 22, 32 with respect to the vehicle 1, as discussed above.

Referring to FIGS. 1, 2 and 11–14, a separate endless belt 42 is preferably disposed about all the wheels 16A, 16B, 16C, 16D, 28 and 34 of each wheel train 36A or 36B. Each belt 42 has an inner circumferential surface 43 and an opposing, outer circumferential surface 44, the four preferred wheels 16A, 16B, 16C and 16D of the wheel assembly 10 being contactable with the belt inner surface 43. As such, the wheels 16A, 16B, 16C and 16D are generally disposed upon the base surface S when the belt outer surface 44 contacts the base surface S. Further, the wheels 16A, 16B, 16C, 16D roll upon the inner surface 43 of the associated belt 42 as the belt 42 circulates about the wheel train 36A or 36B to mobilize the vehicle 1. More specifically, the first wheel 16A and the third wheel 16C roll upon an outer section 43a of the belt inner surface and the second wheel 16B and the fourth wheel 16D roll upon a belt inner surface portion 43b, the two belt sections 43a, 43b being separated by an annular projection or ridge 41. The ridge 41 is disposable, between the each wheel in the pair of wheels 16A, 16B and 16C, 16D mounted to each axle 14, 26, respectively so as to retain the belt 42 disposed upon the associated wheel train 36A or 36B.

Although the vehicle 1 is preferably a tracked paving vehicle having two wheel trains 36A, 36B as discussed above, the vehicle 1 may be any other appropriate vehicle that employs a bogie wheel assembly, such as for example, an excavator, an earth mover or an agricultural tractor (none shown). Further, the wheel assembly 10 may be used independently of a belted wheel train, such as on a wheeled tractor that does not have endless belts/crawlers, so that the wheels 16A, 16B, 16C and 16D are disposed directly upon and directly contact the base surface S. The scope of the present invention includes all appropriate applications of the wheel assembly 10 and is in no manner limited by the type of vehicle 1 with which the assembly 10 is connected.

Figure 6:
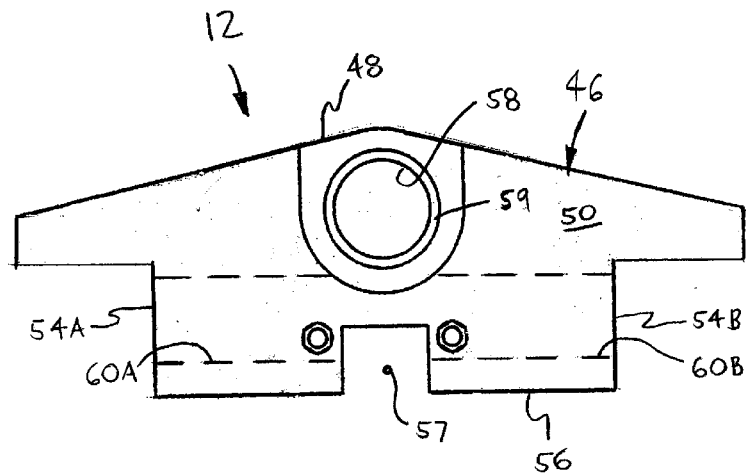
FIG. 6 is front plan view of a frame of the wheel assembly.
Figure 7:
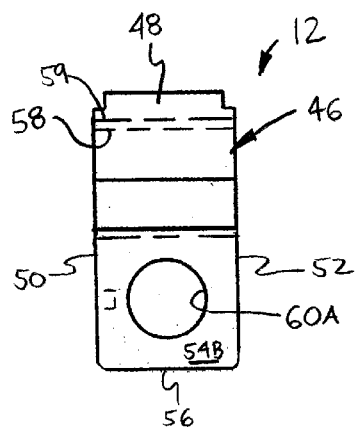
FIG. 7 is a side plan view of the frame.

Referring now to FIGS. 3, 6 and 7, the frame 12 of each wheel assembly 10 essentially functions to connect at least one and preferably the four wheels 16A, 16B, 16C and 16D with the vehicle 1, and as such may be considered to be a "connective member" 12, as discussed in further detail below. Preferably, each frame 12 primarily includes a complex-shaped solid block 46 configured to be connected with the vehicle 1 and to connect the two preferred axles 14 and 26 to the frame 12. The block 46 is preferably formed having an upper, crowned or angled surface 48, front and rear generally flat, parallel surfaces 50, 52, respectively; two inwardly stepped side surfaces 54A, 54B and a generally flat lower surface 56 with a central channel 57 extending between the front and rear surfaces 50 and 52, respectively. Further, the frame block 46 preferably has a central bearing opening 58 configured to receive one of the vehicle shafts 35 or 37 so as to pivotally connect the frame 12 with the vehicle 1.

Preferably, the central opening 58 is provided by a journal bearing sleeve or bushing 59 disposed in a through hole extending between the front and rear surfaces 50, 52 of the block 46. Alternatively, the frame 12 may include a mounting shaft (not shown) fixedly or rotatably attached to the block 46 and configured to connect with an appropriate component on the vehicle 1, such as a bearing assembly or a socket (neither shown). Further, the frame block 46 also preferably includes two generally circular, side bearing openings 60A, 60B extending into the block 46 from each side surface 54A, 54B and to the central channel 57. As such, each side opening 60A, 60B extends generally perpendicularly with respect to the central bearing opening 58. Each side bearing opening 60A, 60B is sized to receive a separate pivot shaft 72 preferably used to pivotally connect each one of the axles 14, 26 to the frame block 46, as described below.

Although preferably formed as described above, it is within the scope of the present invention to form or construct the frame 12 in any desired manner that enables the frame 12 to be pivotally connected to the vehicle 1 and at least one axle 14 to be pivotally connected to the frame 12. For example, the block 46 may be formed in another appropriate shape, such as substantially square or rectangular and/or may be comprised as an assembly of separate blocks, as opposed to a single solid block. Further for example, the frame 12 may be formed as an assembly of connected plates and/or bars with suitable openings, such as provided by insert bushings, configured to connect with the shaft 35 or 37 and the axle(s) 14 (and 26), as discussed above and in further detail below. Furthermore, the frame 12 may be provided by a block, a truss or a plate/bar assembly having shafts or a combination of shaft(s) and opening(s) for rotatable connection with the vehicle 1 and the wheels 16A, 16B, 16C, 16D (alternative structures not shown). The present invention encompasses these and all other appropriate alternative constructions of the frame 12 that enable the wheel assembly 10 to function generally as described herein.

Figure 5:
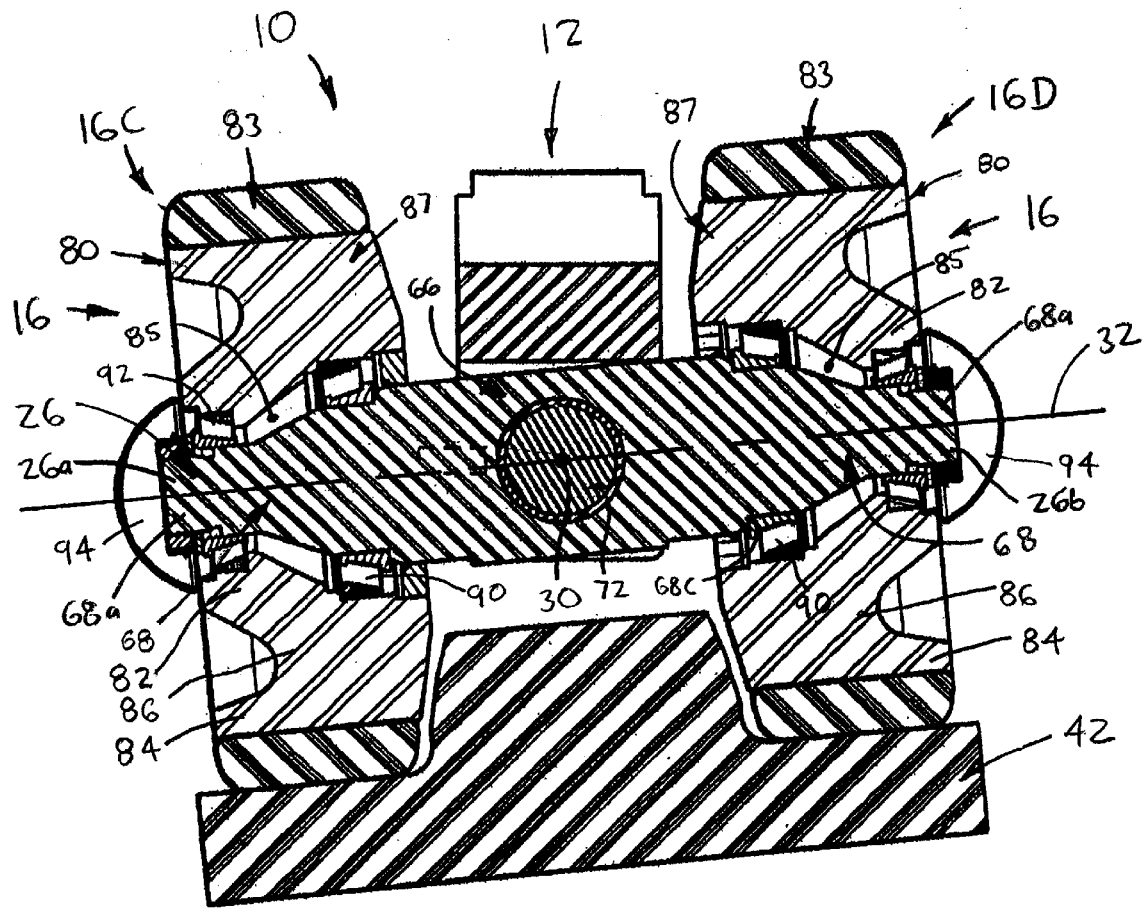
FIG. 5 is a side cross-sectional view of the wheel assembly taken through line 5—5 of FIG. 1.
Figure 8:
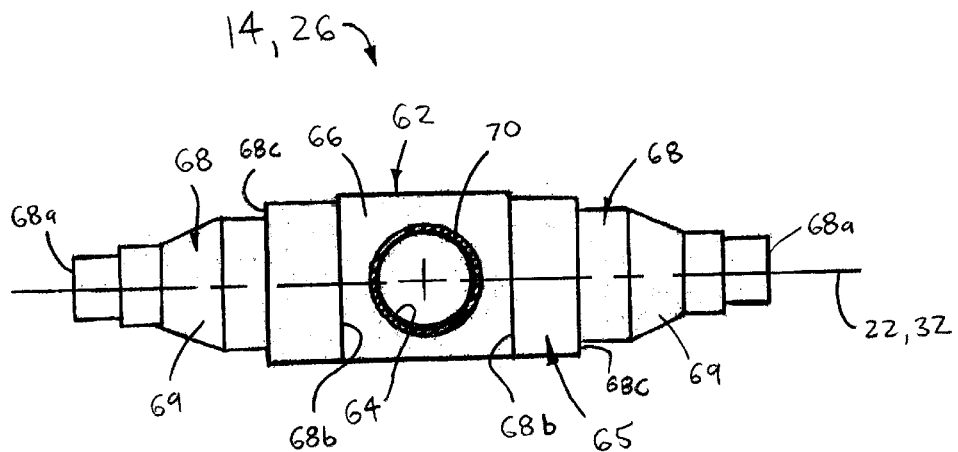
FIG. 8 is a side plan view of an axle of the wheel assembly.

Referring to FIGS. 5 and 8, the first and second axles 14, 26 of each wheel assembly 10 are preferably generally identically constructed and each has a central portion 62 and an opening 64 extending into, and preferably through, the central portion 62. The axle opening 64 is configured to receive a portion of a pivot shaft 72 (as described below) to pivotally connect the axle 14 or 26 with the frame 12, as discussed in further detail below. Preferably, each axle 14, 26 is formed of an elongated body 65 including a generally rectangular block 66 providing the central portion 62 and two wheel shafts 68 each extending from an opposing side of the central block 66. Further, a tubular sleeve or bushing 70 is preferably disposed within the central opening 64 and functions as a journal bearing to facilitate pivotal movement of the axle 14 or 26 upon a particular pivot shaft 72, as discussed below.

Further, each wheel shaft 68 is preferably formed as a generally circular bar 69 having an outer, free end 68a and an inner end 68b integrally formed with the central block 66. The centerline 22 or 32 of each axle 14, 26, respectively, preferably extends longitudinally through the body 65 between the outer ends 68a of the two wheel shafts 68. Preferably, each bar 69 is stepped or tapered so as to be form several circular shaft sections with outside diameters (none indicated) that progressively decrease from the inner end 68b to the outer end 68a. As such, each shaft portion 68 is configured to extend through the central opening 88 of a separate one of the bogie wheels 16A, 16B, 16C or 16D to rotatably mount the wheels 16A, 16B, 16C and 16D to the axles 14 or 26, as described in further detail below. Preferably, the central block 66 and the two wheel shafts 68 are all integrally formed or connected together, such that the axles 14, 16 are each of one piece construction. Alternatively, the axles 14, 26 may be formed of multiple separate pieces attached together by appropriate means, such as by welding or threadably attaching two separate shaft 68 to the central block 66. In addition, the wheel shafts 68 may alternatively be rotatably connected with the central block 66, for example by bearing assemblies, such as if the bogie wheels 16A, 16B, 16C and 16D are fixedly attached to the shafts 68 (structure not shown).

Referring to FIGS. 3 and 5, the wheel assembly 10 further comprises at least one and preferably two pivot shafts 72. Each pivot shaft 72 has a first portion 74 connected with the frame 12 and a second portion 76 spaced from the first portion 74 and disposable within the opening 64 of one of the axles 14 or 26. Thereby, the pivot shafts 72 each pivotally connect a separate one of the axles 14 or 26, with the frame 12, as discussed above and in further detail below. Further, each shaft 72 has a longitudinal centerline 75 extending generally between the first and second portions 74, 76, which each provide a separate one of the second and third axes 20, 30, respectively. Preferably, each pivot shaft 72 is formed as a generally cylindrical bar 77 that includes the first and second shaft portions 74, 76, respectively, and having substantially circular cross-sections in directions perpendicular to the centerline 75. The bars 77 are each sized to fit within one of the frame side openings 60A or 60B with a clearance or interference fit to connect the shaft 72 respectively, with the frame 12.

Preferably, each bar 77 has a threaded hole 79 disposed proximal to the end of the first shaft portion 74. When the pivot shafts 72 are each disposed within the frame holes 60A, 60B, the threaded holes 79 are each engageable by a separate bolt 81 extending into the frame block 46 from the front surface 50. As such, the bolts 81 releasably secure the pivot shafts 72 to the frame 12, but the shafts 72 may be alternatively non-releasably or fixedly attached to the frame block 46, such as for example, by rivets or weldment material (neither shown). Further, the pivot shafts 72 each include a generally square or rectangular retainer plate 78 disposed about the bar 77 proximal to the outer end of the second shaft portion 76. The retainer plates 78 each function to retain the preferred axles 14, 26 slidably disposed upon the second portion 76 of the associated pivot shaft 72, as described below. Further, each plate 78 has an upper edge 78a configured to abut a downward-facing section of the proximal stepped side surface 54A or 54B when the pivot shaft 72 is disposed within the associated side opening 60A or 60B. The plate upper edges 78a thereby function to prevent the pivot shafts 72 from rotating within the frame opening 60A or 60B so as to reduce the stress potentially applied to the bolts 80.

Referring to FIGS. 2 and 3, each axle 14 or 26 is connected with the frame 12 by inserting the associated pivot shaft 72 through the axle central opening 64 until the axle block 66 is disposed about the shaft second portion 76 and against the inner surface 78b of the retainer plate 78. When the axles 14, 26 are so arranged on the pivot shafts 72, each shaft first portion 74 may then be inserted into the associated frame side opening 60A or 60B, and then secured therein as discussed above, so as to rotatably connect the respective axles 14, 26 to the frame 12. The axle bearing sleeves 70 are rotatably slidable about the outer circumferential surface of the pivot shaft second portion 76, to enable each axle 14, 26 to pivot about the second axis 20 or third axis 30, respectively, which extends through the associated shaft 72. Further, the retainer plates 78 each loosely "sandwich" the axle central block 66 between the plate inner surface 78b and the portion of the frame block outer side surface 54A or 54B about the proximal side opening 60A, 60B, respectively. Thereby, the retainer plates 78 maintain the two axles 14 and 26 slidably retained upon the associated pivot shafts 72.

Although the pivot shafts 72 are the preferred means to rotatably connect the two axles 14 and 26 with the frame 12, the wheel assembly 10 may be provided with any other appropriate component or device configured to connect the axles 14, 26 with the frame 12. For example, if the axles 14, 26 were alternatively configured to rotate about the axle centerlines 22, 32, respectively, each axle 14, 26 may be connected with the frame 12 by means of a bearing assembly or a U-joint (neither shown) pivotally attached to the frame 12. Further for example, the axles 14, 26 may each be disposed within or fixedly attached to a block, frame or other structure/component (none shown) pivotally attached to the frame 12. The scope of the present invention encompasses these and all other appropriate structures or means for pivotally connecting the axles 14 and 26 with the frame 12 and is in no means limited by such connection means.

Referring specifically to FIG. 5, each of the bogie wheels 16A, 16A, 16B, 16C and 16D are preferably substantially identically constructed and each is formed as a generally conventional bogie wheel 80 used with a wheeled paver 1. Basically, each wheel 80 includes wheel body 87 and a tire 83 disposed circumferentially about the body 87. The body 87 is preferably formed of a hub portion or hub 82, a circumferential rim portion or rim 84 and a radial flange portion 86 extending between and integrally connecting the hub 82 and rim 86. The hub 82 includes the central opening 85 configured to receive one wheel shaft 68 of an axle 14 or 26 so as to rotatably attach the wheel 80 to the particular axle 14, 26. Preferably, each wheel 80 includes two roller bearings 90, 92 disposed within the central opening 85 on opposing sides of the hub 82. The bearings 90, 92 facilitate rotation of the wheel 80 when mounted upon the axle 14 or 26, in the following manner.

Preferably, the wheels 80 are mounted to an axle 14 or 26, by inserting one of the axle wheel shafts 68 through the wheel hub opening 85 until the inner bearing 90 abuts a shoulder section 68c of the shaft 68. Next, the outer bearing 92 is inserted over the shaft 68 until the bearing 92 abuts a radial shoulder 82a of the hub 82, and then an end cap 94 is attached to the shaft outer end 68a so as to secure the wheel 80 upon the shaft 68. Thereafter, the wheel 80 is rotatable about the centerline 22 or 32 of the particular axle 14, 26, respectively, so as to be rollable upon a surface to mobilize the vehicle 1. Although the described conventional bogie wheels 80 are presently preferred, the wheels 16A, 16B, 16C and 16D may be constructed in any appropriate manner and the scope of the present invention is not in any manner limited by the structure of the wheels 16.

Preferably, each wheel assembly 10 is constructed or assembled by mounting the four wheels 16A, 16B, 16C, 16D to the two axles 14, 26, and then connecting each of the two axles 14, 26 to the frame block 46 to form the complete wheel assembly 10, each of these steps being described in detail above. When so assembled, the wheel assembly 10 is preferably mounted to the vehicle 1 by inserting a pin shaft 35 through the central frame opening 58 and then fixedly attaching the pin shaft 35 to one of the wheel train frames 29, such that the upper portion of the frame 12 is disposed between opposing frame walls 29a, 29b, as best shown in FIG. 4. More specifically, each free end 35a of the pin shaft 35 is secured to one of a pair of aligned attachment plates 31 extending from each frame wall 29a, 29b, preferably by threaded fasteners 96. Alternatively, as shown on FIGS. 10, the frame 12 may be slidably mounted onto a vehicle stub shaft 37, as discussed above, and retained thereon by appropriate means such as a retainer plate or end cap (neither shown) secured to the shaft 37. Thereafter, with either mounting arrangement, the frame bushing 59 is rotatably slidable about the shaft outer circumferential surface 35a (FIG. 4) or 37a (FIG. 12), thereby enabling the frame 12 and the connected wheels 16A, 16B, 16C, and 16D to pivot about the first axis 18.

As indicated in FIGS. 12 and 13, when each wheel assembly 10 is connected with the vehicle 1, the second axis 20 of each assembly 10 is spaced a substantial distance $D_S$ from, and extends generally parallel with respect to, the longitudinal centerline 5 (each axis 5 and 20 extending perpendicularly through FIGS. 12 and 13). As such, the wheel assembly 10 of the present invention is clearly distinguishable from a wheel assembly having one or more axles mounted generally at or near the longitudinal centerline of a vehicle so as to be pivotable about the centerline or an axis proximal to the centerline (structure not shown).

Figure 15:
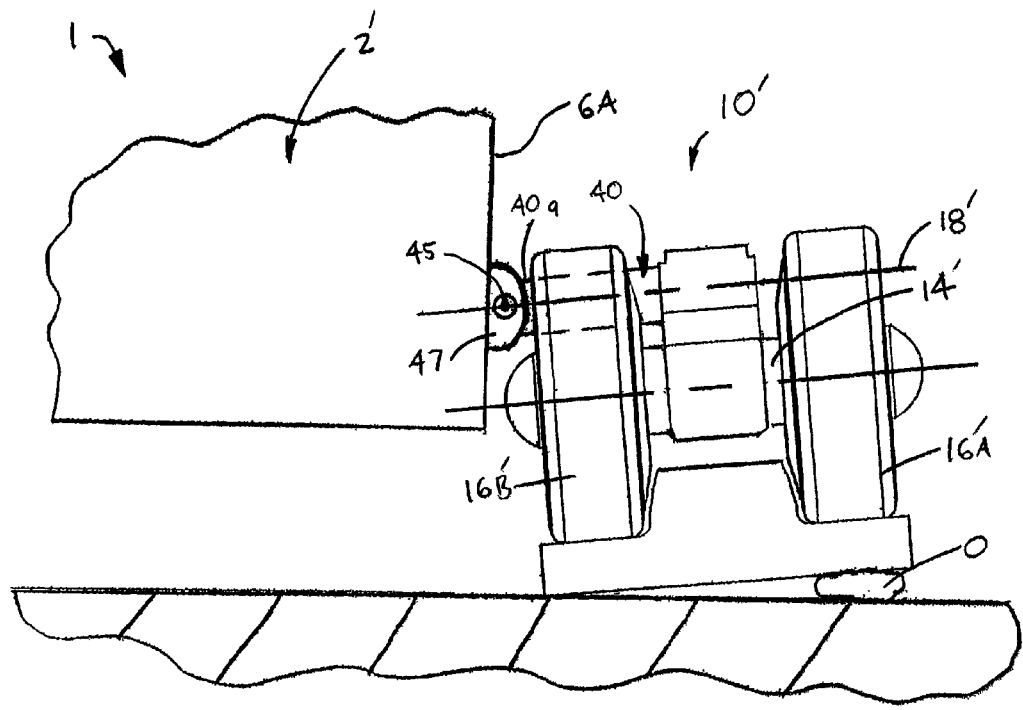
FIG. 15 is a broken-away, rear elevational view of the paving vehicle with a first alternative embodiment of the wheel assembly.

Referring to FIG. 15, in a first alternative embodiment, the wheel assembly 10' may be constructed with the axles 14, 26 (axle 26 not shown) fixedly or non-pivotally attached to the frame 12 and without the two pivot shafts 72 or with shafts 72 that do not rotate about the second and third axes 20, 30, respectively. The first alternative wheel assembly preferably includes a shaft 40 attached to the vehicle 1, connected with the frame 12' and configured to pivot about an axis 45 (extending out of FIG. 15) that extends generally perpendicularly to the first axis 18. Preferably, each vehicle shaft 40 has an inner end 40a pivotally connected to the chassis 2 by a pin connection 47 (as shown), or by a hinge or other appropriate pivotal connection means (none shown). Alternatively, the pivot shafts 40 may be formed to include an inner portion (not shown) fixedly attached to the chassis 2 and an outer portion (not shown) pivotally connected to the inner portion, the outer portion being pivotally connected with the frame 12. With such an alternative structure, the wheel assembly 10' is configured to pivot about the same first axis 18 through the shaft 40, but pivots the entire assembly 10 about the single "second" axis 45. As such, the pivoting of the shaft 40 about the axis 45 pivots all four of the wheels 16A', 16B' (only two shown) of the assembly 10' simultaneously in the same lateral direction.

Figure 16:
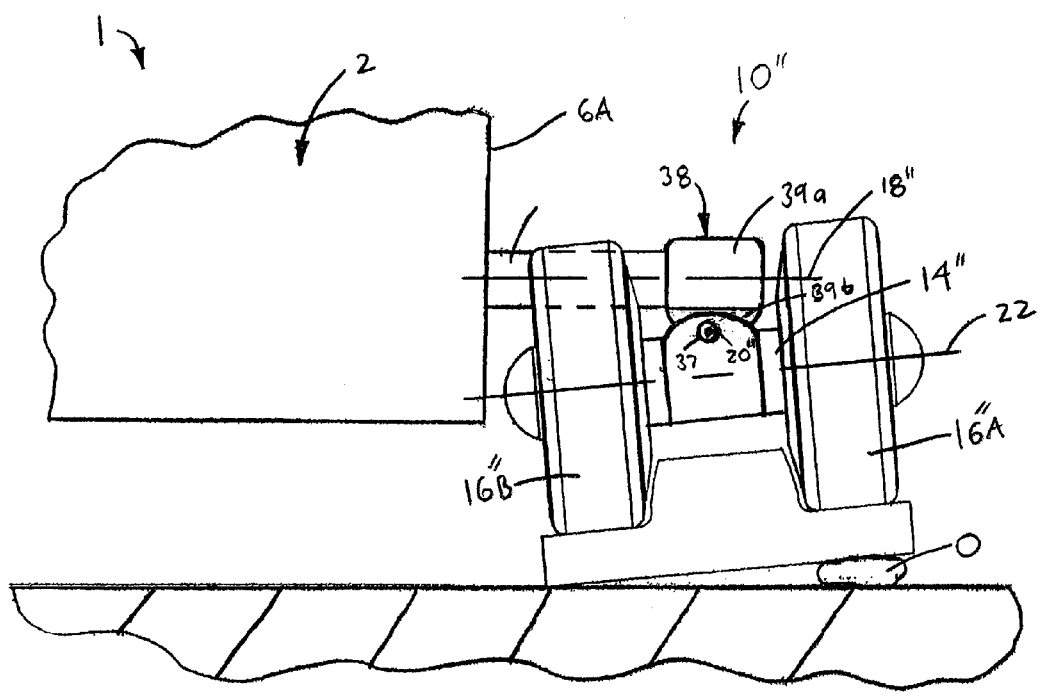
FIG. 16 is broken-away, rear elevational view of the paving vehicle with a second alternative embodiment of the wheel assembly.

Referring now to FIG. 16, in a second alternative embodiment, the wheel assembly 10" may be constructed without a frame 12. Such a wheel assembly 10" comprises a single axle 14", connected with the vehicle 1 and at least one and preferably two wheels 16A and 16B connected with the axle 14". The axle 14" is configured to pivot about a first axis 18" and is also configured to pivot about a second axis 20". Such a wheel assembly 10" preferably includes a connective member 38 having a first, upper portion 39a pivotally connectable with one of the vehicle shafts 35 or 37 and a second, lower portion 39b pivotally connected with the upper portion 39a and configured to connect with the axle 14". Preferably, the connective member 38 has a bearing or bushing (not shown) similar to the bushing 59 of frame 12 and configured to receive an end portion of the vehicle shaft 35 or 37. Further, the axle 14" is configured to connect with the connective member 38 by means of joint, such as a pin joint 37, so that the second axis 20 (extending perpendicularly through FIG. 16) extends through the center of the pin 37. Alternatively, the connective member 38 may be provided by any other appropriate component or device, the frame 12 as described herein being essentially such a connective member 38, but configured to connect two axles 14 and 26 (as opposed to the single axle 14") with the vehicle 1.

With the wheel assemblies 10, 10' or 10" constructed as described above, a paver vehicle 1 is provided with the following advantages over pavers having previous known wheel assemblies, as described in the Background Section above. First, as described above and shown in FIGS. 13 and 14, when the paver 1 traverses a surface S having a substantial lateral slope, either positive or negative as defined above, the axles 14 and 26 each pivot about the third and second axes 22, 32, respectively, as necessary to ensure that the wheels 16A, 16B, 16C and 16D remain in contact with the base surface S. As such, the weight of the vehicle 1 is distributed generally evenly between the four wheels 16A, 16B, 16C and 16D of each wheel assembly 10, as opposed to being concentrated on the two inner wheels 16B, 16D when traversing a positive slope (FIG. 13) and the two outer wheels 16A, 16C when traversing a negative slope (FIG. 14). Further, as shown in FIGS. 9, 10, 13 and 14, when an individual wheel assembly 10 traverses a small obstacle O on the surface S (e.g., a stone) or a depression in the surface S, the axles 14, 26 each pivot respectively about the second axis 22 and the third axis 32. Such axle movement enables one wheel (e.g., 16A) to vertically displace upwardly or downwardly as necessary to negotiate or travel over the obstacle or depression, while the other wheel (e.g., 16B) mounted on the same axle 14 or 26 remains in contact with the surface S (i.e., through the belt 42).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally described herein.

I claim:

1. A wheel assembly for mobilizing a construction vehicle upon a base surface, the wheel assembly comprising:
   a frame connected with the vehicle and configured to be pivotable about a first axis so as to angularly displace with respect to the vehicle;
   an axle connected with the frame and configured to be generally freely pivotable about a second axis so as to angularly displace with respect to the frame, the second axis extending generally perpendicularly with respect to the first axis, the axle having a longitudinal centerline extending generally perpendicularly with respect to the second axis; and
   a wheel connected with the axle, configured to rotate generally about the axle centerline and disposable generally upon the base surface, the wheel being vertically displaceable by at least one of angular displacement of the frame about the first axis and angular displacement of the axle about the second axis while the vehicle traverses the base surface.

2. The wheel assembly as recited in claim 1 wherein when the wheel is disposed generally upon the base surface, the wheel rolls with respect to the base surface so as to at least partially mobilize the vehicle.

3. The wheel assembly as recited in claim 1 wherein angular displacement of the frame about the first axis displaces the wheel with respect to the vehicle generally within a first plane and angular displacement of the axle about the second axis displaces the wheel with respect to the vehicle generally within a second plane, the second plane being generally perpendicular to the first plane.

4. The wheel assembly as recited in claim 3 wherein:
   the vehicle has a chassis with a front end, a rear end and two spaced apart sides extending between the front and rear ends; and
   the first and second axes are each generally horizontal, the first plane is generally vertical and extends generally parallel to the two sides and generally perpendicularly with respect to the front and rear ends, and the second plane is generally vertical and extends generally parallel to the front and rear ends and generally perpendicularly with respect to the two sides.

5. The wheel assembly as recited in claim 1 wherein:
   the axle has two opposing ends, the second axis extends generally horizontally through the axle between the two ends, and the wheel is connected with the axle proximal to one of the two ends; and
   the wheel assembly further comprises another wheel connected with the axle proximal to the other one of the two ends such that angular displacement of the axle about the second axis displaces each wheel vertically with respect to the other wheel.

6. The wheel assembly as recited in claim 5 wherein when the base surface has an offset section spaced vertically from a remaining section of the base surface, the axle angularly displaces about the second axis so that one of the two wheels is disposable generally upon the offset surface section while the other one of the two wheels is disposed generally upon the remaining surface section.

7. The wheel assembly as recited in claim 1 further comprising:
   another axle connected with the frame so as to be spaced from the axle, the other axle being configured to be pivotable about a third axis extending generally perpendicularly with respect to the first axis, the other axle having a longitudinal centerline extending generally perpendicularly with respect to the third axis; and
   another wheel connected with the other axle, configured to rotate generally about the other axle centerline and disposable generally upon the base surface.

8. The wheel assembly as recited in claim 1 wherein the vehicle includes an endless belt having an inner circumferential surface and an opposing, outer circumferential surface contactable with the base surface, the belt being disposed about the wheel assembly such that the wheel contacts and rolls upon the belt inner surface, the wheel being generally disposed upon the base surface when the belt outer surface contacts the base surface.

9. The wheel assembly as recited in claim 1 further comprising a pivot shaft connected with the frame and having a longitudinal centerline providing the second axis, the axle being connected with the shaft so as to be pivotable generally about the shaft centerline.

10. The wheel assembly as recited in claim 1 wherein the vehicle has a shaft and the frame is formed as a generally solid block, the block having an opening configured to receive the vehicle shaft so as to pivotally connect the frame with the vehicle.

11. The wheel assembly as recited in claim 1 wherein:
    the axle has a central portion and an opening extending into the central portion; and
    the wheel assembly further comprises a pivot shaft having a first portion connected with the frame, a second portion spaced from the first portion and disposed within the axle opening to pivotally connect the axle with the frame, and a longitudinal centerline extending generally between the first and second portions and providing the second axis.

12. A wheel assembly for mobilizing a paving vehicle upon a base surface, the vehicle having an endless belt disposed about the wheel assembly, the belt having an inner circumferential surface and an opposing, outer circumferential surface, the wheel assembly comprising:
    an axle connected with the vehicle and having a longitudinal centerline, the axle being configured to generally freely pivot about a first axis and further configured to generally freely pivot about a second axis, the second axis extending generally perpendicularly with respect to the first axis and generally perpendicularly with respect to the axle centerline; and
    a wheel connected with the axle and contactable with the belt inner surface, the wheel being configured to rotate generally about the axle centerline such that the wheel rolls upon the belt inner surface as the belt circulates about the wheel train to mobilize the vehicle, the wheel being vertically displaceable by at least one of angular displacement of the axle about the first axis and angular displacement of the axle about the second axis while the vehicle traverses the base surface.

13. The wheel assembly as recited in claim 12 further comprising a frame pivotally connected with the vehicle so as to be angularly displaceable about the first axis, the axle being pivotally connected with the frame so as to be angularly displaceable about the second axis.

14. The wheel assembly as recited in claim 12 wherein the first and second axes are each generally horizontal, the wheel is displaceable generally within a first vertical plane by pivotal displacement of the axle about the first axis, and the wheel is displaceable generally within a second vertical plane by pivotal displacement of the axle about the second axis, the second plane being generally perpendicular to the first plane.

15. The wheel assembly as recited in claim 12 further comprising:
   a stub shaft having a first end pivotally connected with the vehicle so as to be angularly displaceable about the first axis and a second, free end; and
   a frame pivotally connected with the second end of the stub shaft so as to be angularly displaceable about the second axis, the axle being connected with the frame.

16. A wheel assembly for mobilizing a construction vehicle upon a base surface, the wheel assembly comprising:
   a connective member movably connected with the vehicle and configured to be pivotable about a first axis and configured to be pivotable about a second axis extending generally perpendicularly with respect to the first axis;
   an axle attached to the connective member so as to be generally freely pivotable about the second axis and having a longitudinal centerline extending generally perpendicularly with respect to the second axis; and
   a wheel connected with the axle and configured to rotate generally about the axle centerline such that when the wheel is disposed generally upon the base surface, the wheel rolls with respect to the surface so as to mobilize the vehicle, the wheel being generally vertically displaceable by at least one of angular displacement of the connective member about the first axis and angular displacement of the axle about the second axis while the vehicle traverses the base surface.

17. The wheel assembly as recited in claim 16 wherein the connective member includes:
   a first portion pivotally connected with the vehicle so as to be angularly displaceable about the first axis; and
   a second portion pivotally connected with the first portion so as to be angularly displaceable about the second axis, the axle being attached to the member second portion.

18. The wheel assembly as recited in claim 17 wherein displacement of the connective member first portion about the first axis displaces the axle within a first plane and angular displacement of the connective member second portion about the second axis displaces the axle within a second plane, the second plane extending generally perpendicularly with respect to the first plane.

19. The wheel assembly as recited in claim 16 wherein the connective member is a frame pivotally connected with the vehicle so as to be angularly displaceable about the first axis, the axle being pivotally connected with the frame so as to be angularly displaceable about the second axis.

20. A bogie wheel assembly for mobilizing a paving vehicle chassis upon a base surface, the chassis having a front end, a rear end and a longitudinal centerline extending generally between the front and rear ends, the wheel assembly comprising:
   an axle connected with the chassis and configured to be generally freely pivotable about an axis, the axis being spaced from and extending generally parallel with respect to the chassis centerline, the axle having two opposing ends and a longitudinal centerline extending generally perpendicularly with respect to the axis; and
   two wheels, each wheel being movably connected with a separate one of the two axle ends so as to be rotatable generally about the axle centerline and rollable with respect to the base surface to mobilize the vehicle upon the surface, each one of the two wheels being vertically displaceable with respect to the other one of the two wheels by angular displacement of the axle about the axis while the vehicle traverses the base surface.

21. The bogie wheel assembly as recited in claim 20 wherein when the base surface has an offset section spaced vertically from a remaining section of the base surface, the axle angularly displaces about the axis so that one of the two wheels is disposable generally upon the offset surface section while the other one of the two wheels is disposed generally upon the remaining surface section.

22. The bogie wheel assembly as recited in claim 20 wherein:
   the vehicle further includes an endless belt disposed about the bogie wheel assembly and having an inner circumferential surface and an opposing outer circumferential surface, the outer surface being contactable with the base surface; and
   each one of the two wheels rolls upon the belt inner surface as sections of the belt outer surface contact the base surface such that the two wheels remain generally disposed upon the base surface.

23. A paving vehicle comprising:
   a chassis having a front end, a rear end, first and second opposing sides and a longitudinal centerline extending between the front and rear ends;
   a first wheel assembly connected with the first chassis side and including an axle, the axle having a central portion, two opposing ends and a centerline extending between the two ends, the axle being configured to generally freely pivot about a first horizontal axis extending through the central portion and generally parallel with respect to the chassis centerline, and two wheels each movably connected with a separate end of the axle so as to be rotatable about the axle centerline, each one of the two wheels being vertically displaceable with respect to the other one of the two wheels by angular displacement of the axle about the first axis while the vehicle traverses the base surface; and
   a second wheel assembly connected with the second chassis side such that the first and second assemblies are disposed on opposing sides of the chassis centerline, the second wheel assembly including an axle, the axle having a central portion, two opposing ends and a centerline extending between the two ends, the axle being configured to generally freely pivot about a second horizontal axis extending through the central portion and generally parallel with respect to the chassis centerline, and two wheels each movably connected with a separate end of the axle so as to be rotatable about the axle centerline, each one of the two wheels being vertically displaceable with respect to the other one of the two wheels by angular displacement of the axle about the second axis while the vehicle traverses the base surface.

24. The paving vehicle as recited in claim 23 wherein when the vehicle traverses a base surface having two converging, angled surface sections such that the first wheel assembly is disposed upon one of the two surface sections and the second wheel assembly is generally disposed upon the other one of the two surface sections, the axle of the first wheel assembly angularly displaces in a first angular direction about the axis of the first wheel assembly while the axle of the second wheel assembly angularly displaces in a second, opposing angular direction about the axis of the second wheel assembly such that the two wheels of the first assembly are generally disposed upon the one surface section and the two wheels of the second wheel assembly are generally disposed upon the other surface section.

25. A bogie wheel assembly for a paving vehicle, the wheel assembly comprising:

a frame movably connected with the vehicle so as to be pivotable about a first axis;

an axle having a longitudinal centerline and being movably connected with the body so as to be generally freely pivotable about a second axis, the second axis extending generally perpendicularly with respect to the axle centerline and generally perpendicularly with respect to the first pivot axis; and a bogie wheel movably connected with the axle so as to be rotatable about the axle centerline, the wheel being displaceable generally within a first plane by pivotal displacement of the frame about the first axis and displaceable within a second plane by pivotal displacement of the axle about the second axis, the second plane being generally perpendicular to the first plane, the wheel being displaceable within the second plane while the vehicle traverses a base surface.

\* \* \* \* \*